(12) United States Patent
Allen

(10) Patent No.: US 6,822,456 B2
(45) Date of Patent: Nov. 23, 2004

(54) BI-METALLIC TEST SWITCH

(76) Inventor: David M. Allen, 93890 Pope Rd., Blachly, OR (US) 97412

( * ) Notice: Subject to any disclaimer, the term of this patent is extended or adjusted under 35 U.S.C. 154(b) by 206 days.

(21) Appl. No.: 10/206,465

(22) Filed: Jul. 26, 2002

(65) Prior Publication Data
US 2004/0018418 A1 Jan. 29, 2004

(51) Int. Cl.7 ............................................. G01N 27/416
(52) U.S. Cl. ..................................................... 324/432
(58) Field of Search ...................... 324/432; 340/636.14, 340/636.15; 429/93

(56) References Cited

U.S. PATENT DOCUMENTS

| | | | |
|---|---|---|---|
| 2,522,660 A | 9/1950 | Bledsoe, Jr | 362/208 |
| 3,454,873 A | 7/1969 | Abrahams | 324/437 |
| 3,656,080 A | 4/1972 | Wells | 337/111 |
| 3,753,095 A | 8/1973 | Nichols | 324/437 |
| 3,764,893 A | * 10/1973 | Weigand | 324/432 |
| 3,870,857 A | 3/1975 | Horwitt et al. | 219/267 |
| 4,726,661 A | 2/1988 | Parker | 324/104 |
| 4,799,038 A | 1/1989 | Tabei | 337/379 |
| D302,074 S | 7/1989 | Halasz | D3/208 |
| 5,059,895 A | 10/1991 | Cataldi et al. | 324/104 |
| 5,204,615 A | 4/1993 | Richards et al. | 324/757 |
| 5,262,728 A | 11/1993 | Shershen | 324/506 |
| 5,386,351 A | 1/1995 | Tabor | 362/201 |
| 5,478,665 A | 12/1995 | Burroughs et al. | 429/90 |
| 5,525,439 A | 6/1996 | Huhndorff et al. | 429/91 |
| 5,538,806 A | 7/1996 | Weiss et al. | 429/90 |
| 5,543,246 A | 8/1996 | Treger | 429/90 |
| 5,569,556 A | 10/1996 | Bohmer | 429/91 |
| 5,673,028 A | 9/1997 | Levy | 340/635 |
| 5,804,798 A | 9/1998 | Takeda | 219/511 |
| 5,867,028 A | 2/1999 | Bailey | 324/435 |
| 5,870,013 A | 2/1999 | Van Der Grijn et al. | 337/343 |
| 5,925,480 A | 7/1999 | Shacklett, III et al. | 429/93 |
| 6,025,087 A | 2/2000 | Trosper | 429/92 |
| 6,054,234 A | 4/2000 | Weiss et al. | 429/93 |
| 6,130,409 A | 10/2000 | Batut et al. | 219/265 |
| 6,135,633 A | 10/2000 | DiMarco et al. | 374/1 |
| 6,335,113 B1 | 1/2002 | Nakatani et al. | 429/90 |
| 2001/0019794 A1 | 9/2001 | Horie et al. | 429/90 |
| 2002/0025470 A1 | 2/2002 | Klein | 429/90 |

* cited by examiner

Primary Examiner—Pia Tibbits
(74) Attorney, Agent, or Firm—Black Lowe & Graham PLLC

(57) ABSTRACT

A convoluted, bi-metallic test strip is inserted between a battery and an electrical circuit within a flashlight having a nonzero, quiescent, current drain. Squeezing the test strip permits consumers to temporarily test the flashlight. The strip is then removed by consumers after the flashlight has been purchased.

20 Claims, 2 Drawing Sheets

BI-METALLIC TEST SWITCH

TECHNICAL FIELD

The invention relates to low cost, disposable test switches. More specifically, the invention relates to low cost, disposable test switches for use by consumers to determine an electrical characteristic of a battery-operated device.

BACKGROUND OF THE INVENTION

Low cost test switches have recently become available so that consumers can verify a characteristic of an electronic device such as a battery. "Test strips" are presently available which permit a consumer to determine the level of charge on a battery (e.g. AA size, AAA size, etc.) by depressing a strip, often integrated into the battery packaging, against the positive and negative terminals of the battery. A current flows through the strip generating heat. A thermochromic material within the strip then changes color to indicate the charge on the battery. U.S. Pat. No. 6,054,234 to Weiss et al. and U.S. Pat. No. 5,925,480 to Shacklett III, et al., the disclosures are incorporated herein by reference, disclose devices and techniques for making battery test strips which illustrate the state of the art with respect to this technology. While devices of this type are useful for their intended purpose, they are not suitable for testing an electronic device which is connected to the battery.

In the consumer flashlight art, consumers often desire to test the flashlight prior to its purchase. Many such flashlights are offered for purchase with batteries already installed. Provided that the flashlight is provided with a momentary on/off switch of the pushbutton type, manufactures often provide packaging which permits operation of the momentary pushbutton switch through the packaging so as to permit consumers to perform such examinations of the flashlight. Traditionally, flashlights of this type have utilized one or more dry cells in series with an incandescent bulb, all contained within a plastic or metallic housing.

Recent advances in semiconductor technology have provided artisans in this area of technology with the opportunity to use light-emitting diodes (hereinafter occasionally "LEDs") as a primary light source and substitute for an incandescent bulb. LEDs are far more efficient with respect to current consumption as compared to incandescent bulbs. Due to this increased efficiency, it has ben possible to replace the standard plurality of "D" cells, "AA" cells, or the like with so-called "button cells" having a small discoid shape. An early example of a convenience flashlight of this type is disclosed in U.S. Pat. No. 5,386,351 to Tabor, issued on Jan. 31, 1995, entitled "Convenience Flashlight." The disclosure of the Tabor patent is incorporated herein by reference. The device disclosed by Tabor has a two-piece, snap-fit case containing a discoid battery, an LED, and a pushbutton penetrating one of the snap-shut case halves. As is well known by those of ordinary skill in the electronics art, LEDs have two legs. One leg is connected to the anode of the LED, while the remaining leg is connected to the cathode. Tabor advantageously positions one of the LED legs adjacent to one side (i.e., one terminal) of the button battery while the resilient nature of the remaining leg resides in a normally spaced-apart relationship from the other side (i.e., other terminal) of the battery. The pushbutton is used to depress this remaining leg against the other terminal of the button battery, thereby completing the electrical circuit and illuminating the LED. Releasing pressure from the button permits the LED leg to resiliently resume its initial position out of contact with the other terminal of the button battery, thereby breaking the electrical circuit and extinguishing the LED. Convenience flashlights of the type disclosed in Tabor can be advantageously tested by the consumer at the point of purchase, even if the product is packaged, providing that the packaging permits the consumer to depress the button.

A more advanced version of a convenience flashlight employing a button cell battery and an LED illumination source is disclosed by Allen, the inventor herein, in International Publication No. WO 01/77575 A1 published on Oct. 18, 2001, entitled "Portable Illumination Device." The Allen device incorporates a microprocessor, or micro controller circuit, into the LED/battery/pushbutton circuit to provide the illumination device with enhanced features, including a blinking mode, an automatic off mode, a low power mode, etc. These factors are all controlled by sequential depression of the pushbutton from the logical operation of the microprocessor or micro controller. One disadvantage of the device disclosed by Allen as compared to the device disclosed by Tabor is that although modern microprocessors or micro controllers have relatively low current drains even while in a "sleep mode" (i.e., while not performing any logic functions) the quiescent current drains of such devices are nonzero. Thus, a button cell LED-type personal flashlight, which might ordinarily have a shelf life of over ten years, may only have a shelf life of approximately two to three years if such device incorporates a modern microprocessor or micro controller. To avoid this result, the manufacturers of devices such as the portable illumination device disclosed in the Allen International Publication may insert a strip of insulating material between one terminal of the button cell battery and an electrical contact of the micro controller, microprocessor, or other circuit element to prevent the circuit from being completed. Upon purchasing the device, the consumer merely removes this insulating strip to render the device functional. If the device is provided with a clamshell-like, snap-fit case, often the insulating strip can be removed from the device with a sharp tug on a free end of the insulating strip without opening or closing the device case.

Although the aforementioned insulating strip solves the problem of undesirable current drain while personal illumination devices of the type described are on store shelves, the insulating strip prevents consumers from being able to test the personal lighting device while the device is in its packaging. This result is undesirable from a marketing point of view.

SUMMARY OF THE INVENTION

It is therefore an object of the present invention to provide a low cost, temporary switch for installation in battery-powered devices which may be actuated by a consumer while the device is in its packaging for testing of the device.

It is a further object of the present invention to provide for a temporary test switch which achieves the above object and which also is readily removable by the consumer after the device has been purchased and removed from its packaging.

It is yet another object of the present invention to provide for a test switch which achieves the above objects and which is also inexpensive to manufacture and easy to use.

The invention achieves the above objects, and other objects and advantages which will be apparent from the description which follows, by providing a low cost, convoluted test strip for testing a battery-powered device. The strip is positionable between terminals of a power supply circuit incorporating the battery. As used herein, the term "battery"

encompasses any self-contained power source, such as dry cells, wet cells, fuel cells, or any other device of similar type which may be hereinafter devised. The test strip of the present invention incorporates an elongated, insulating layer defining upper and lower sides. Conductive material is applied on the upper side and the lower side, but the upper and lower sides are not normally in electrical conduction with each other. One portion of the strip is preferably placed in the electrical circuit of a portable, battery-powered device to inhibit electrical conduction through the device. Another end of the strip is provided with a convolution such that a portion of the lower conductive surface is suspended in a spaced-apart relationship with respect to an adjacent portion of the upper surface. Nevertheless, the juxtaposed upper and lower conductive surfaces are sufficiently close together such that pressing the surfaces together creates electrical continuity between the upper and lower surfaces of the strip which are interposed within the electrical circuit so that the electrical device, such as a flashlight, may be tested by consumer. The invention is especially well adapted for use in a packaged product in which the consumer nevertheless can squeeze the packaging such that the convoluted potion can be compressed to test the device within the packaging.

In the preferred embodiment of the invention, the elongated, flexible insulating layer is both flexible and resilient, so that upon releasing the cantilevered portion of the strip with respect to the non-cantilevered portion, electrical continuity is discontinued and the test strip may be repeatedly used by various consumers until the device is removed from its packaging and the test strip removed from the device. In one preferred embodiment of the invention, the convoluted test strip has a first fold, which is at approximately a 45-degree angle with respect to the main body or non-cantilevered portion of the test strip, and wherein the convoluted test strip is provided with a second fold at an angle of approximately 135 degrees with respect to the first fold, such that the test strip is doubled back upon itself, with the cantilevered and non-cantilevered portions being substantially parallel to one another. In an alternate embodiment of the invention, the convolution is provided by twisting the test strip along its longitudinal axis by approximately 180 degrees and then bending the test strip back upon itself so that the opposite, conductive sides of the test strip are facing one another in a manner similar to the first embodiment.

In the preferred embodiment of the invention, the insulated layer may be formed of a polymer material, and the conductive layers may be formed of a metallic material, such as copper or aluminum.

DETAILED DESCRIPTION OF THE PREFERRED EMBODIMENTS

Figure 1:
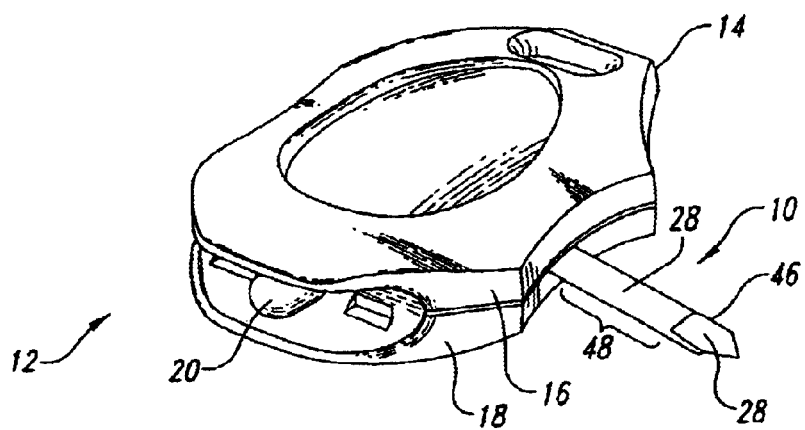
FIG. 1 is an isometric, perspective view of a squeeze-type, LED flashlight incorporating a convoluted test strip of the present invention.

A convoluted test strip in accordance with the principles of the invention is generally indicated at reference numeral 10 in the various Figures of the attached drawings, wherein numbered elements in the Figures correspond to like numbered elements herein. The test strip is shown in use with an LED, squeeze-type flashlight generally indicated at reference numeral 12. The flashlight is of the type having a clamshell case 14, commonly manufactured from a thermoplastic material, having an upper half 16 and a lower half 18 which are engaged in a "snap fit." The flashlight includes an LED 20 which is part of an electrical circuit incorporating a discoid battery 22, and a logic circuit 24 in the form of a microprocessor or micro controller, all of which are schematically represented in FIG. 5.

Figure 5:
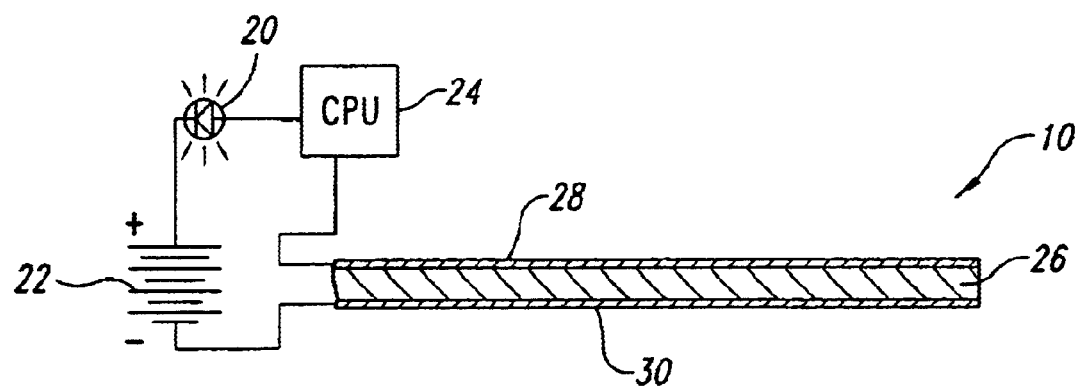
FIG. 5 is a schematic representation of the test stip in unfolded condition, integrated into an electrical circuit.

As best seen in FIG. 5, the test strip is provided with a flexible, insulating layer 26 which can be manufactured from an appropriate thermoplastic, such as polyethylene terephthalate (PET). The insulating layer 26 preferably has a thickness of approximately 0.1 mm (0.004. inch). Polyester sheeting having a thickness of between approximately 2–3 thousands of an inch has also been used successfully. The insulating layer defines upper and lower surfaces which are coated with an upper conductive layer 28 and an lower conductive layer 30. The conductive layers are preferably metallized foil, such as copper or aluminum, and may be applied by any conventional means, such as by an adhesive or by vapor deposition. A copper coating having a thickness of approximately seventeen microns is preferred. A similar thickness of aluminum is also acceptable. Prefabricated material from which strips 10 can be cut is available from Sheldahl, Inc., Chandler, Ariz., U.S.A. The sheet material is preferably cut into small strips approximately three inches long by one-eighth inch wide, such that the upper and lower conductive layers 28, 30, are not in electrical continuity with one another.

As shown in FIGS. 1 and 5, one end of the test strip is placed inside of the case 14, such that the strip inhibits electrical continuity through the circuit shown in FIG. 5 when the strip is in its rest position. Preferably, the strip is inserted between the logic circuit 24 and the battery 22, although in theory positioning the strip in any position within the electric circuit would be satisfactory.

Figure 2:
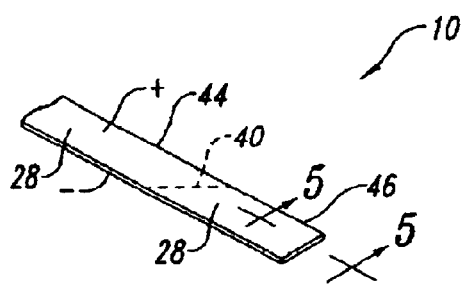
FIG. 2 is a fragmentary, isometric view of the test strip, illustrating the position of a first fold of the invention.
Figure 3:
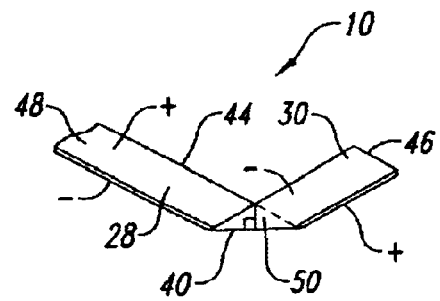
FIG. 3 is partial, isometric view of the test strip showing a tab portion being formed by executing the first fold.
Figure 4:
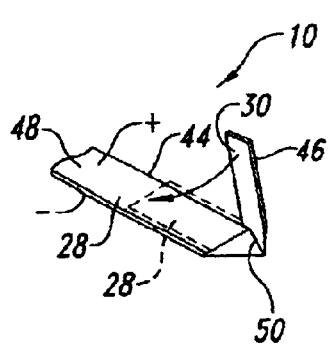
FIG. 4 is a partial, isometric view of the test strip showing the tab portion being doubled over the remaining portion of the test strip by means of a second fold.

In order to permit the test strip to perform as a temporary switch, the test strip is preferably folded along a first fold line 40 shown in FIG. 2. The first fold line preferably forms an approximately forty-five degree angle with respect to an edge 44 of the test strip, as best seen in FIG. 2. The first fold line 40 delineates an end tab portion 46 from a main body portion generally indicated at reference numeral 48. The end tab portion 46 is then folded over itself at second fold line 50 and as shown in FIG. 4 so as to assume the position shown in FIG. 4 and in FIG. 1, wherein the end tab portion 46 is cantilevered over the main body portion 48. Fold line 50 forms an angle of approximately one-hundred-thirty-five degrees with respect to the edge 44 of the test strip. In this configuration, it is apparent that the lower conductive layer 30 on the end tab portion 46 will be cantilevered above the upper conductive layer 28 on the main body portion 48 in a spaced-apart relationship due to the thickness of the folded-over material in the vicinity of the first and second fold lines 40, 50. It has been found that by using a thermoplastic material of the thickness described above and by sufficiently deforming the strip at the folds with gentle finger pressure (beyond its limit of elastic deformation), the strip 10 is permanently deformed so that it will not resume the shape shown in FIG. 5. Nevertheless, the first and second folds continue to maintain the upper and lower conductive layers in a spaced-apart relationship in the vicinity of the end tab portion 46. The consumer may therefore merely compress the end tab portion 46 in its cantilevered configuration, shown in FIGS. 1 and 4 against the main body portion 48 thereunder, so as to complete the electrical circuit and temporarily activate the logic circuit 24 whereby the LED 20 is illuminated so as to test flashlight 12. In this manner, undesirable discharge of the battery 22 through the circuit is avoided while the flashlight 12 is on the shelf prior to sale. It is believed that the shelf life of the product with the test strip 10 installed will be on the order of approximately 10 years, whereas the same flashlight 12 without the test strip 10 installed would have a shelf life of only approximately two to three years.

Figure 6:
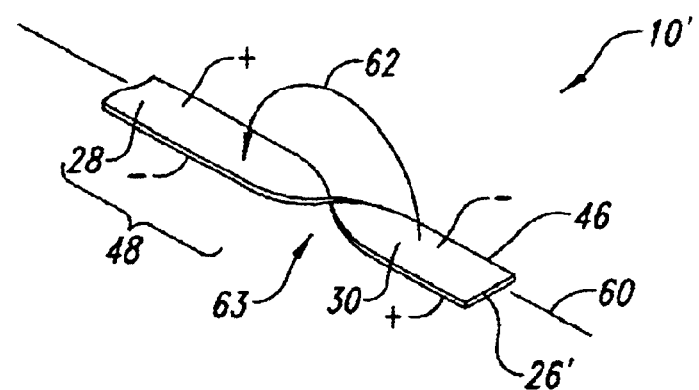
FIG. 6 is a partial, isometric view, illustrating an alternate embodiment of the convolution of the test strip from the previous Figures.

An alternative embodiment of 10' is shown in FIG. 6, in which the end tab portion 48 is twisted about a longitudinal axis 60 of the test strip by approximately 180 degrees. The end tab portion 46 is then folded over, as shown by arrow 62, such that the lower conductive layer 30 will be cantilevered above the conductive layer 28, as illustrated in FIGS. 1 and 4 of the previous embodiment. In this alternate embodiment however, the insulating layer 26' cannot be excessively resilient, otherwise the test strip 10' will lose the twist generally indicted at reference numeral 63, which forms the convolution of this alternate embodiment. A permanently deformable insulating material such as cardboard is preferred. This alternate embodiment, therefore, is apparently only useful for a single test, at which point relieving pressure from the convoluted portion of the test strip 10' will not necessarily result in the discontinuance of electrical continuity. Those of ordinary skill in the art will of course appreciate that the product packaging could be designed so as to provide the resilient characteristic between the bent-over end tab portion 46 and the main body 48 to provide enhanced functionality for this embodiment.

Those of ordinary skill in the art will conceive of other alternate embodiments of the invention upon reviewing this disclosure. By way of example and not limitation, the test strip could be used with electrical devices other than flashlights. Thus, the invention is not to be limited to the above description, but is to be determined in scope by the claims which follow.

What is claimed is:

1. A low cost convoluted test strip for testing a battery powered device, the strip being positionable between terminals of a power supply circuit incorporating the battery, comprising:

an elongated, flexible insulating layer defining upper and lower sides and first and second ends;

an upper conductive layer on the upper side;

a lower conductive layer on the lower side, the conductive layers being substantially electrically insulated from one another by the insulating layer; and, a convoluted portion adjacent to the first end of the strip, such that a portion of the lower conductive layer is cantilevered above and resiliently suspended with respect to an adjacent non-cantilevered portion of the upper conductive layer whereby the cantilevered portion of the strip can be depressed with respect to the non-cantilevered portion of the strip to establish electrical continuity between the conductive layers.

2. The convoluted test strip of claim 1, wherein the insulating layer is both flexible and resilient so that upon releasing the cantilevered and non-cantilevered portions with respect to one another the electrical continuity is discontinued and so that the test strip may be used repeatedly.

3. The convoluted test strip of claim 1, wherein the convoluted portion includes an one hundred and eighty degree twist of the strip about a longitudinal axis of the strip.

4. The convoluted test strip of claim 1, wherein the convoluted portion includes first and second folds of the strip.

5. The convoluted test strip of claim 4, wherein the first fold is at approximately a forty five degree angle with respect to the non-cantilevered portion and wherein the second fold is at approximately a one hundred thirty-five degree angle with respect to the first fold such that the strip is folded back on itself with the cantilevered and non-cantilevered portions being substantially parallel to one another.

6. The convoluted test strip of claim 1, wherein the insulating layer is manufactured from a polymer resin and the upper and lower conductive layers are manufactured from metal.

7. The convoluted test strip of claim 6, wherein the metal is copper.

8. The convoluted test strip of claim 6, wherein the metal is aluminum.

9. The convoluted test strip of claim 1, wherein the second end of the strip is positioned between terminals of a power supply circuit incorporating the battery in the battery powered device.

10. The convoluted test strip of claim 9, wherein the battery powered device is a personal flashlight.

11. A low cost convoluted test strip for testing a battery powered device, the strip being positionable between terminals of a power supply circuit incorporating the battery, comprising:

an elongated, insulating layer defining upper and lower sides;

an upper conductive layer on the upper side;

a lower conductive layer on the lower side; and, a convoluted portion adjacent to an end of the strip, such that a portion of the lower conductive layer is cantilevered above and suspended with respect to an adjacent non-cantilevered portion of the upper conductive layer whereby the cantilevered portion of the strip can be depressed with respect to the non-cantilevered portion of the strip to establish electrical continuity between the conductive layers.

12. The convoluted test strip of claim 11, wherein the insulating layer is both flexible and resilient so that upon releasing the cantilevered and non-cantilevered portions with respect to one another the electrical continuity is discontinued and so that the test strip may be used repeatedly.

13. The convoluted test strip of claim 11, wherein the convoluted portion includes an one hundred and eighty degree twist of the strip about a longitudinal axis of the strip.

14. The convoluted test strip of claim 11, wherein the convoluted portion includes first and second folds of the strip.

15. The convoluted test strip of claim 14, wherein the first fold is at approximately a forty five degree angle with respect to the non-cantilevered portion and wherein the second fold is at approximately a one hundred thirty-five degree angle with respect to the first fold such that the strip is folded back upon itself with the cantilevered and non-cantilevered portions being substantially parallel to one another.

16. The convoluted test strip of claim 11, wherein the insulating layer is manufactured from a polymer resin and the upper and lower conductive layers are manufactured from metal.

17. The convoluted test strip of claim 16, wherein the metal is copper.

18. The convoluted test strip of claim 16, wherein the metal is aluminum.

19. The convoluted test strip of claim 11, wherein a portion of the strip distal from the convoluted portion is positioned between terminals of a power supply circuit incorporating the battery in the battery powered device.

20. A process for manufacturing a convoluted test strip for testing a battery powered device, the strip being positionable between terminals of a power supply circuit incorporating the battery, comprising the steps of:

providing an elongated, flexible strip manufactured from an electrically insulating material, coating opposite sides of the strip with an electrically conductive material;

convoluting an end portion of the strip in a first fold at approximately a first angle with respect to a main body portion of the strip so as to form a tab portion; and, convoluting the tab portion at the first fold at a second angle with respect to the first fold such that the tab portion is suspended over the main body portion in a cantilever fashion whereby depressing the tab portion with respect to the main body portion can establish electrical continuity between the opposite sides of the strip.

* * * * *